US010776123B2

United States Patent
Swanson et al.

(10) Patent No.: US 10,776,123 B2
(45) Date of Patent: Sep. 15, 2020

(54) FASTER SPARSE FLUSH RECOVERY BY CREATING GROUPS THAT ARE MARKED BASED ON AN INSTRUCTION TYPE

(71) Applicant: Advanced Micro Devices, Inc., Santa Clara, CA (US)

(72) Inventors: Erik D. Swanson, Ft. Collins, CO (US); Michael Estlick, Ft. Collins, CO (US); Sneha V. Desai, Sunnyvale, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 72 days.

(21) Appl. No.: 16/207,548

(22) Filed: Dec. 3, 2018

(65) Prior Publication Data

US 2020/0174796 A1    Jun. 4, 2020

(51) Int. Cl.
*G06F 9/38*        (2018.01)

(52) U.S. Cl.
CPC .......... *G06F 9/3861* (2013.01); *G06F 9/3867* (2013.01); *G06F 9/3869* (2013.01)

(58) Field of Classification Search
CPC ............................ G06F 9/3861; G06F 9/3867
See application file for complete search history.

(56) References Cited

U.S. PATENT DOCUMENTS

| | | | |
|---|---|---|---|
| 6,553,430 B1 | 4/2003 | Keller | |
| 6,898,697 B1 | 5/2005 | Gao et al. | |
| 7,266,673 B2 | 9/2007 | Filippo et al. | |
| 8,924,758 B2 | 12/2014 | Steinman et al. | |
| 2005/0050303 A1* | 3/2005 | Rosner | G06F 9/3885 712/218 |
| 2006/0179346 A1* | 8/2006 | Bishop | G06F 11/1407 714/13 |
| 2007/0083742 A1* | 4/2007 | Abernathy | G06F 9/3838 712/244 |

* cited by examiner

*Primary Examiner* — Jyoti Mehta

(74) *Attorney, Agent, or Firm* — Kowert Hood Munyon Rankin and Goetzel PC; Rory D. Rankin

(57) ABSTRACT

Systems, apparatuses, and methods for performing efficient processor pipeline flush recovery are disclosed. A processor core includes a retire queue for storing information of outstanding instructions. When the retire queue logic detects that a pipeline flush condition occurs, the logic creates one or more groups of entries in the retire queue. The logic begins the groups with an entry storing information for a youngest outstanding instruction, and creates other groups in a contiguous manner after creating this first group. The logic marks with a first indication a given group when the given group includes one or more instructions of a given type. The logic marks with a second indication the given group when the given group does not include an instruction of the given type. The logic sends to flush recovery logic information of one or more entries in only groups marked with the first indication.

20 Claims, 8 Drawing Sheets

FASTER SPARSE FLUSH RECOVERY BY CREATING GROUPS THAT ARE MARKED BASED ON AN INSTRUCTION TYPE

BACKGROUND

Description of the Related Art

Computing systems process applications using a variety of processors. Examples of the processors are a general-purpose central processing unit (CPU), a graphics processing unit (GPU), an accelerated processing unit (APU), an input/output (I/O) device, and so forth. A processor, such a CPU, uses one or more processor cores for the simultaneous processing of multiple software threads of execution. These processor cores typically use pipelining. The pipeline processes instructions of a software application with any number of pipeline stages. Each pipeline stage performs a portion of the instruction processing. Instruction processing generally includes fetching instructions, decoding instructions, executing instructions, and storing the execution results in destinations identified by the instructions.

To increase the number of instructions processed per thread in each pipeline stage, the processor cores overlap pipeline stages and perform out-of-order issue and execution of instructions. To increase this number of instructions in each pipeline stage, the processor core performs speculative execution. Examples of speculative execution are branch prediction and store-to-load forwarding. The speculative execution allows the processing of instructions to continue based on a prediction, rather than wait until requested data or control flow information is ready. In a later pipeline stage, the processor core verifies the prediction.

When the processor core determines that a prediction for a speculative instruction is correct, the processor core considers the speculative instruction is complete. However, when the processor core determines the prediction is incorrect, the processor core flushes the speculative instruction and instructions in the pipeline younger than the speculative instruction from the pipeline. In some cases, the processor core replays these flushed instructions.

To reduce the penalty of flushing the pipeline, the processor core performs flush recovery. During flush recovery, the processor core recovers machine state information based on the processing of a selected instruction. The recovered machine state includes at least the contents of the register file, information stored in particular control and status registers as well as certain queues, and the logical-to-physical register number mappings used for register renaming. One method the processor core uses for flush recovery is checkpointing, which allows the processor core to recover from branch mispredictions, store-to-load forwarding mispredictions, and possibly other exceptions. However, checkpointing uses many storage elements to maintain the machine state information. These numerous storage elements consume both on-die area and power consumption.

In view of the above, efficient methods and systems for performing efficient processor pipeline flush recovery are desired.

BRIEF DESCRIPTION OF THE DRAWINGS

The advantages of the methods and mechanisms described herein may be better understood by referring to the following description in conjunction with the accompanying drawings, in which.

Figure 1:
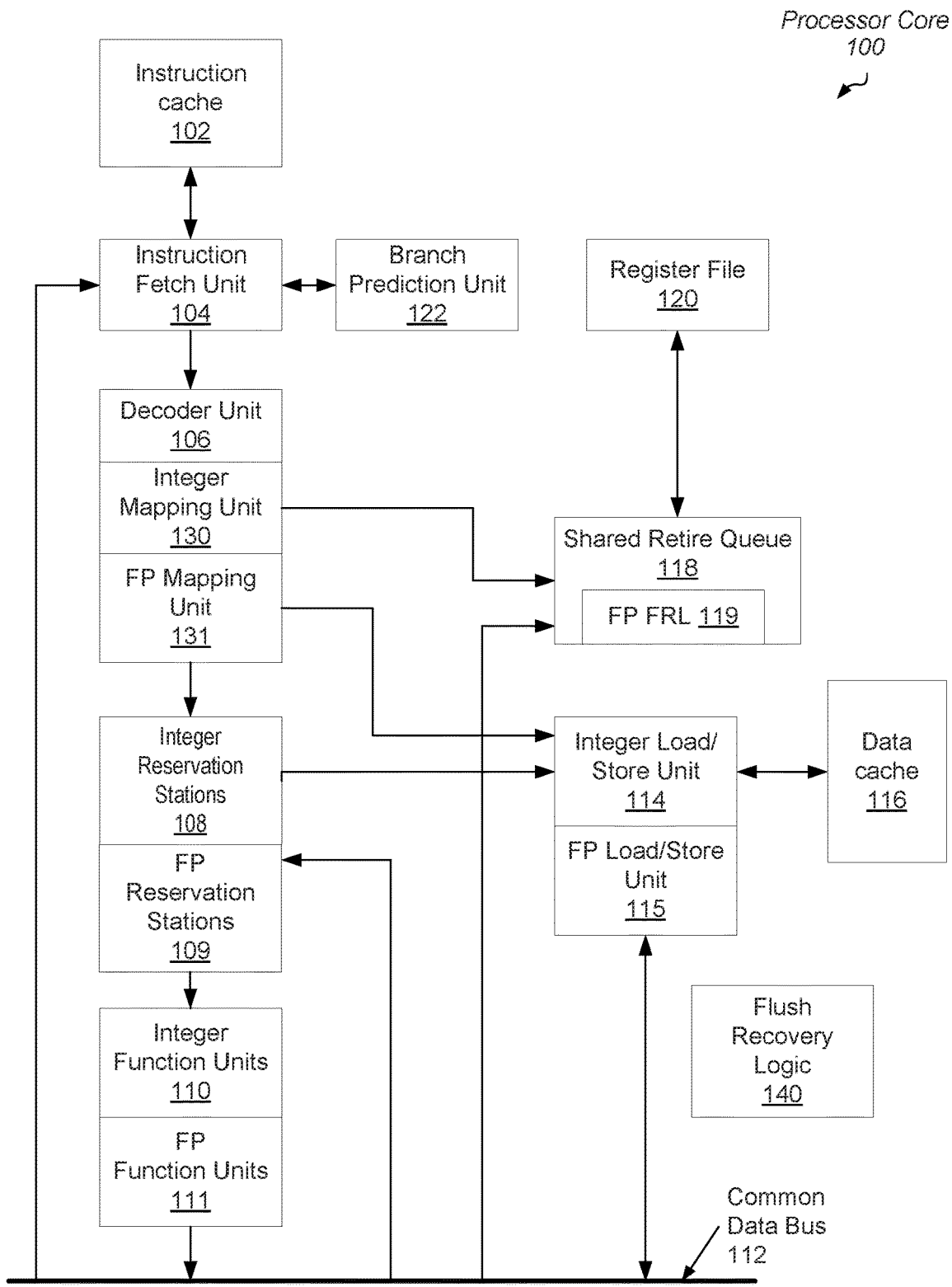
FIG. 1 is a block diagram of one embodiment of a processor core.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the scope of the present invention as defined by the appended claims.

DETAILED DESCRIPTION OF EMBODIMENTS

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Various systems, apparatuses, methods, and computer-readable mediums for performing efficient processor pipeline flush recovery are disclosed. A processor core includes a retirement queue (or retire queue) with multiple entries. Each entry stores information for outstanding instructions that the processor core is processing. The processor core has not yet committed the results of these outstanding instructions to machine state. Logic for the retire queue detects when a pipeline flush condition occurs. For example, logic in a particular pipeline stage of the processor core determines a speculative branch instruction mispredicted and notifies other logic in other pipeline stages.

When the logic of the retire queue (or the retire queue logic) detects that the pipeline flush condition occurs, the retire queue logic creates one or more groups of entries in the retire queue. As used herein, creating a group refers to identifying or deeming one or more entries as belonging to a given group. In some cases, each of the groups has a same number of entries. In an embodiment, the retire queue logic begins creating the groups with an entry storing information for a youngest outstanding instruction stored in the retire queue. In such a case, this entry is considered the first entry in the first group. In one embodiment, the retire queue logic creates other groups in a contiguous manner after creating this first group. For example, the retire queue logic creates a second group contiguous to the first group. The retire queue logic creates a third group contiguous to the second group, and so on. In some embodiments, the retire queue logic continues to create groups until reaching an entry storing information for an instruction that caused the pipeline flush condition. In other embodiments, the retire queue logic continues to create groups until wrapping around the retire queue and reaching the first group. The retire queue logic maintains indexes for the groups. In one example, if the retire queue logic creates nine groups, then these groups have indexes from 1 to 9. Alternatively, these groups have indexes from 0 to 8, or some other numbering.

In various embodiments, the retire queue logic marks with a first indication a given group of the created one or more groups when the logic determines the given group includes one or more instructions of a given type. In one example, the first indication is a binary bit corresponding to the given group and the logic asserts this bit to indicate that the given group includes one or more instructions of the given type. In contrast, the retire queue logic marks with a second indication different from the first indication the given group when the logic determines the given group does not include an instruction of the given type. In various embodiments, this second indication is indicated by a lack of the first indication.

In one example, the instructions of the given type are floating-point instructions. For example, the processor core uses separate resources for integer instructions and floating-point instructions although these instructions share the same retire queue. Examples of the separate resources are instruction schedulers and register rename units. In some designs, the processor core uses checkpointing for flush recovery of the integer instructions. However, the processor core does not use checkpointing for flush recovery of the floating-point instructions due to the increased on-die area and power consumption related to checkpointing.

The retire queue logic sends to flush recovery logic information of one or more entries storing information for floating-point instructions in any group marked with the first indication. In contrast, the retire queue logic prevents the sending of information in entries in any group marked with the second indication to the flush recovery logic. Therefore, the processor core avoids sequentially stepping through the entries of the retire queue one-by-one during flush recovery for floating-point instructions. Typically, floating-point instructions are more sparsely located in the retire queue than integer instructions. Skipping one or more groups of entries in the retire queue that do not store information for floating-point instructions accelerates the flush recovery. Likewise, the processor core avoids using checkpointing during flush recovery for the floating-point instructions.

Referring to FIG. 1, one embodiment of a generalized block diagram of a processor core 100 that performs out-of-order execution is shown. Core 100 includes circuitry for executing instructions according to one of a variety of instruction set architectures (ISAs). Core 100 uses blocks for integer type instructions and separate blocks for floating-point instructions. For example, core 100 includes separate mapping units 130 and 131, separate reservation stations 108 and 109, separate load/store units 114 and 115, and separate function units 110 and 111 for integer instructions and floating-point instructions. In some designs, the components, such as blocks 109, 111, 115 and 131, are included within a floating-point coprocessor. Some blocks are shared such as at least the instruction fetch unit 104, the decoder unit 106 and the retirement queue 118 (or retire queue 118). The retire queue 118 is also referred to as a reorder buffer 118.

Core 100 includes flush recovery logic 140 for performing the steps of a pipeline flush recovery when a pipeline flush recovery condition occurs. For example, logic within the core 100 detects a branch misprediction occurred, a store-to-load forwarding misprediction occurred, or other. Flush recovery logic 140 in the core 100 returns machine state of the register file 120, multiple queues and control and status registers (not shown) to values used before any updates performed based on a selected instruction. Flush recovery logic 140 in the core 100 also recovers physical register names in the mapping units 130 and 131 to values used before any updates performed based on the selected instruction. In some designs, core 100 uses checkpointing for flush recovery of integer instructions. Checkpointing allows the core 100 to recover from branch mispredictions, store-to-load forwarding mispredictions, and possibly other exceptions. However, checkpointing uses many storage elements to maintain the machine state information. These numerous storage elements consume both on-die area and power consumption. Rather than use checkpointing for floating-point instructions, core 100 uses the floating-point (FP) flush recovery logic (FRL) 119 in the shared retire queue 118 to support flush recovery logic 140.

In some designs, processor core 100 (or core 100) is one of multiple processor cores used within a processor. In other designs, core 100 is the single-core processor. Core 100 is included in either a single-processor configuration or a multi-processor configuration. In some designs, core 100 is used within a processing node of a multi-node system. Based on the particular design, core 100 is embodied in a general-purpose central processing unit (CPU), a parallel data microarchitecture such as a graphics processing unit (GPU), a digital signal processor (DSP), combinations thereof or the like.

The instruction cache 102 stores instructions for a software application and the data cache 116 stores data used in computations performed by the instructions. Generally speaking, a cache stores one or more blocks, each of which is a copy of data stored at a corresponding address in the system memory, which is not shown. As used herein, a "block" is a set of bytes stored in contiguous memory locations, which are treated as a unit for coherency purposes. Core 100 maintains coherency between the caches and the memory system. Core 100 maintains coherency if an update to a block is reflected by other cache copies of the block according to a predefined coherency protocol. Various specific coherency protocols are well known. In some designs, a block is also the unit of allocation and deallocation in a cache. The number of bytes in a block is varied according to design choice, and may be of any size.

Caches 102 and 116, as shown, are integrated within processor core 100. Alternatively, caches 102 and 116 are coupled to core 100 in a backside cache configuration or an inline configuration, as desired. Still further, caches 102 and 116 are implemented as a hierarchy of caches. In some cases, caches 102 and 116 each represent level-one (L1) and level two (L2) cache structures. Alternatively, each of caches 102 and 116 represents an L1 cache structure and a shared cache structure is an L2 cache structure. Other combinations are possible and contemplated. Caches 102 and 116 and any shared caches each include a cache memory coupled to a corresponding cache controller. If core 100 is included in a multi-core system, a memory controller (not shown) is used for routing packets, receiving packets for data processing, and synchronizing the packets to an internal clock used by logic within core 100.

The instruction fetch unit (IFU) 104 fetches multiple instructions from the instruction cache 102 per clock cycle if there are no instruction cache misses. The IFU 104 includes a program counter (PC) register that holds a pointer to an address of the next instructions to fetch from the instruction cache 102. The branch prediction unit 122 predicts the information of instructions that change the flow of an instruction stream from executing a next sequential instruction. An example of prediction information includes a 1-bit value containing a prediction of whether or not a condition is satisfied that determines if a next sequential instruction should be executed or an instruction in another location in the instruction stream should be executed next. Another example of prediction information is an address of a next instruction to execute that differs from the next sequential instruction. In order to predict a branch condition, the PC used to fetch the branch instruction from memory is used to index branch prediction logic in the branch prediction unit 122. The determination of the actual outcome, and whether or not the prediction was correct, occurs in a later pipeline stage. For example, one of the function units 110 and 111 determines the actual outcome. In an alternative design, IFU 104 includes the branch prediction unit 122, rather than have the two implemented as two separate units.

Branch instructions include different types such as conditional, unconditional, direct, and indirect. A conditional branch instruction performs a determination of which path to take in an instruction stream. If the branch instruction determines a specified condition, which may be encoded within the instruction, is not satisfied, then the branch instruction is considered to be not-taken and the next sequential instruction in a program order is executed. However, if the branch instruction determines a specified condition is satisfied, then the branch instruction is considered to be taken. Accordingly, a subsequent instruction, which is not the next sequential instruction in program order, but rather is an instruction located at a branch target address, is executed. An unconditional branch instruction is considered an always-taken conditional branch instruction. There is no specified condition within the instruction to test, and execution of subsequent instructions always occurs in a different sequence than sequential order.

For some branch instructions, a branch target address is specified by an offset, which is stored in the branch instruction itself, relative to the linear address value stored in the program counter (PC) register. This type of branch instruction with a self-specified branch target address is referred to as a direct branch instruction or a direct branch. For other types of branch instructions, the branch target address is specified by a value in a register or memory, where the register or memory location is stored in the branch instruction. This type of branch instruction with an indirect-specified branch target address is referred to as indirect branch instruction or an indirect branch. Further, in an indirect branch instruction, the register specifying the branch target address is loaded with different values.

The decoder unit 106 decodes the opcodes of the multiple fetched instructions. Decoder unit 106 allocates entries in the in-order retire queue 118 (reorder buffer 118) in one of reservation stations 108 and 109, and in one of load/store units 114 and 115. The allocation of entries in the reservation stations 108 and 109 is considered dispatch. The reservation stations 108 and 109 act as an instruction queue where instructions wait until their operands become available. When operands are available and hardware resources are also available, an instruction is issued out-of-order from the reservation stations 108 and 109 to the integer and floating-point functional units 110 and 111 or to the integer and floating-point load/store units 114 and 115.

The functional units 110 and 111 include arithmetic logic units (ALU's) for computational calculations such as addition, subtraction, multiplication, division, and square root. Logic is included to determine an outcome of a branch instruction (a speculative instruction) or a speculative load instruction, and to compare the calculated outcome with the predicted value. Store-to-load forwarding is used to increase instruction level parallelism, but the speculative load instruction cannot be committed until the predicted store-to-load dependency is verified. If a branch misprediction or a speculative load misprediction occurred, the subsequent instructions after the speculative instruction in program order need to be removed. Sometimes a new fetch with the correct PC value needs is performed.

The load/store units 114 and 115 include queues and logic to execute a memory access instruction. In addition, verification logic resides in the load/store unit 114 to ensure a load instruction received forwarded data, or bypass data, from the correct youngest store instruction. Results from the functional units 110-111 and the load/store units 114-115 are presented on a common data bus 112. The results are sent to the retire queue 118. Here, an instruction that receives its results, is marked for retirement, and is head-of-the-queue has its results sent to the register file 120. The register file 120 holds the architectural state (machine state) of the general-purpose registers of processor core 100. Then the instruction in the retire queue 118 is retired in-order and its head-of-queue pointer is adjusted to the subsequent instruction in program order.

The results on the common data bus 112 are sent to the reservation stations 108-109 in order to forward values to operands of instructions waiting for the results. When these waiting instructions have values for their operands and hardware resources are available to execute the instructions, they are issued out-of-order from the reservation stations 108-109 to the appropriate resources in the functional units 110-111 or the load/store units 114-115. Results on the common data bus 112 are routed to the IFU 104 and branch prediction unit 122 in order to update control flow prediction information and/or the PC value.

When the FP FRL logic 119 (or logic 119) of the retire queue 118 receives an indication from the flush recovery logic 140 or other logic in the core 100 that a branch misprediction or a store-to-load prediction is incorrect, which is a pipeline flush condition, the logic 119 creates one or more groups of entries in the retire queue. In some cases, each of the groups has a same number of entries. In an embodiment, the logic 119 begins the groups with an entry storing information for a youngest outstanding instruction. For example, this entry is the first entry in the first group. In one embodiment, the logic 119 creates the other groups in a contiguous manner after creating this first group. In some embodiments, the logic 119 continues to create groups until reaching an entry storing information for an instruction that caused the pipeline flush condition. In other embodiments, the logic 119 continues to create groups until wrapping around the retire queue and reaching the first group.

In various embodiments, the logic 119 marks with a first indication a given group of the created one or more groups when the logic 119 determines the given group includes one or more instructions of a given type. In some cases, the instructions of the given type are floating-point instructions. In one example, the first indication is a binary bit corresponding to the given group and the logic 119 asserts this bit to indicate that the given group includes one or more instructions of the given type. In contrast, the logic 119 marks with a second indication different from the first indication the given group when the logic determines the given group does not include an instruction of the given type.

The logic 119 sends to flush recovery logic 140 information of one or more entries storing information for floating-point instructions in any group marked with the first indication. In one example, the logic 119 sends an instruction identifier identifying the floating-point instruction stored in a retire queue entry in a group marked with the first indication. The instruction identifier includes one or more of a retire queue identifier that identifies the entry in the retire queue that stores the instruction, a reservation station tag identifying the instruction, a thread identifier identifying the source of the instruction, and so on. In contrast, the logic 119 prevents the sending of information in entries in any group marked with the second indication to the flush recovery logic 140. Therefore, the processor core 100 avoids sequentially stepping through the entries of the retire queue 118 in these particular groups one-by-one during flush recovery for floating-point instructions. Typically, floating-point instructions are more sparsely located in the retire queue 118 than integer instructions. Skipping one or more groups of entries in the retire queue 118 that do not store information for floating-point instructions accelerates the pipeline flush recovery. Likewise, the processor core 100 avoids using checkpointing during flush recovery for the floating-point instructions.

Figure 2:
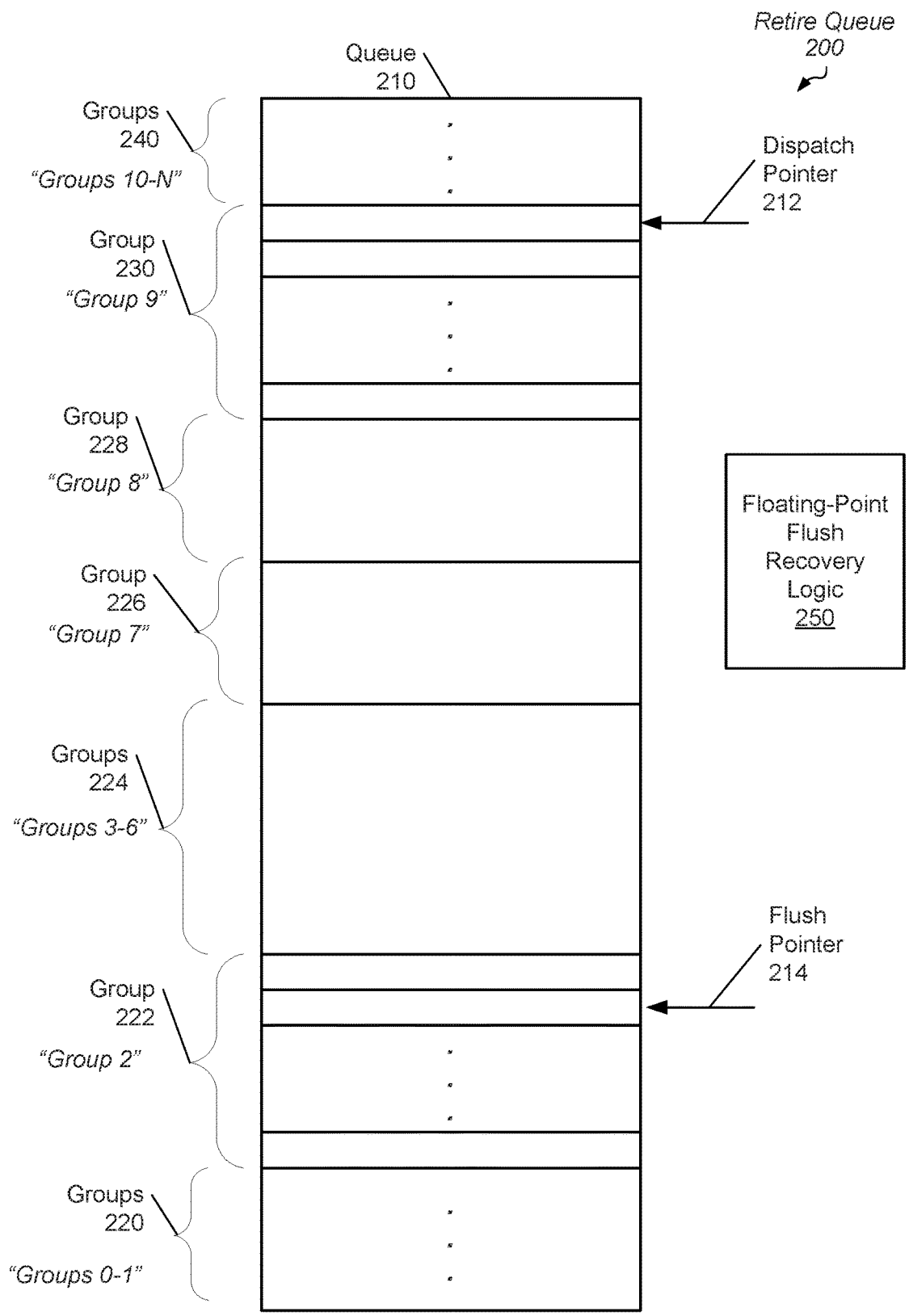
FIG. 2 is a block diagram of one embodiment of a retire queue.

Referring to FIG. 2, a generalized block diagram of one embodiment of a retire queue 200 is shown. Retire queue 200 includes queue 210, pointers 212-214 and floating-point flush recovery logic 250 (or logic 250). Access logic is not shown for ease of illustration. Queue 210 stores information for outstanding instructions in an in-order manner in one of a variety of data storage structures. For example, queue 210 is implemented with one or more of registers, caches, latches, content addressable memory (CAM), or other. The retire queue 200 retires instructions in-order and its head-of-queue pointer (not shown) is adjusted to the subsequent instruction in program order.

The retire queue 200 uses the dispatch pointer 212 to identify the entry of queue 210 that stores information for the youngest outstanding instruction. The retire queue 200 uses the flush pointer 214 to identify the entry of queue 210 that stores information for an instruction that caused a flush condition. For example, the instruction is a branch instruction that mispredicted or a speculative load instruction that mispredicted.

Logic 250 uses one or more of software, hardware such as circuitry to implement combinatorial logic and sequential elements, and a combination of software and hardware. When the logic 250 detects that a pipeline flush condition occurs or the logic 250 is notified that a pipeline flush condition occurred, the logic 250 creates the one or more groups 220-240 of entries in the retire queue. In some cases, each of the groups 220-240 has a same number of entries. In an embodiment, the logic 250 begins the groups with an entry storing information for the youngest outstanding instruction. Again, dispatch pointer 212 identifies this entry. In an embodiment, this entry is the first entry in the first group 230. In one embodiment, the logic 250 creates the other groups in a contiguous manner after creating this first group 230.

In some embodiments, the logic continues to create groups until reaching the entry storing information for the flush-causing instruction. Flush pointer 214 identifies this instruction. In such cases, logic 250 creates the groups 222-230. In other embodiments, the logic 250 continues to create groups until wrapping around the queue 210 and reaching the first group 230. The logic 250 maintains indexes for the groups. As shown, group 230 is "group 9" and group 222 is "group 2." As shown, logic 250 creates groups having indexes from 0 to N where N is a non-zero positive integer. Other numberings for the group indexes are possible and contemplated.

In various embodiments, the logic 250 marks with a first indication a given group of the groups 0-N (or groups 220-240) when the logic 250 determines the given group includes one or more instructions of a given type. In some embodiments, logic 250 maintains a table (not shown) with each entry corresponding to a particular group of groups 220-240. In one example, the first indication is a binary bit corresponding to the given group and the logic 250 asserts this bit to indicate that the given group includes one or more instructions of the given type. In one case, a Boolean logic high value is used to mark these groups. In other cases, a Boolean logic low value is used to mark these groups. In contrast, the logic 250 marks with a second indication different from the first indication the given group when the logic 250 determines the given group does not include an instruction of the given type. In one example, the instructions of the given type are floating-point instructions.

The logic 250 sends to external flush recovery logic information of one or more entries storing information for floating-point instructions in any group marked with the first indication. In contrast, the logic 250 prevents the sending of information in entries in any group marked with the second indication to the flush recovery logic. For example, if logic 250 determines groups 9, 6 and 4 include one or more floating-point instructions, then in some cases, the logic 250 sends information corresponding to instructions in only groups 9, 6 and 4, rather than information in each of groups 9 to 2. Therefore, the processor core avoids sequentially stepping through the entries of the queue 210 one-by-one during flush recovery for floating-point instructions. Typically, floating-point instructions are more sparsely located in the queue 210 than integer instructions. Skipping one or more groups of groups 220-240 accelerates the pipeline flush recovery. Likewise, the processor core avoids using checkpointing during flush recovery for the floating-point instructions.

Figure 3:
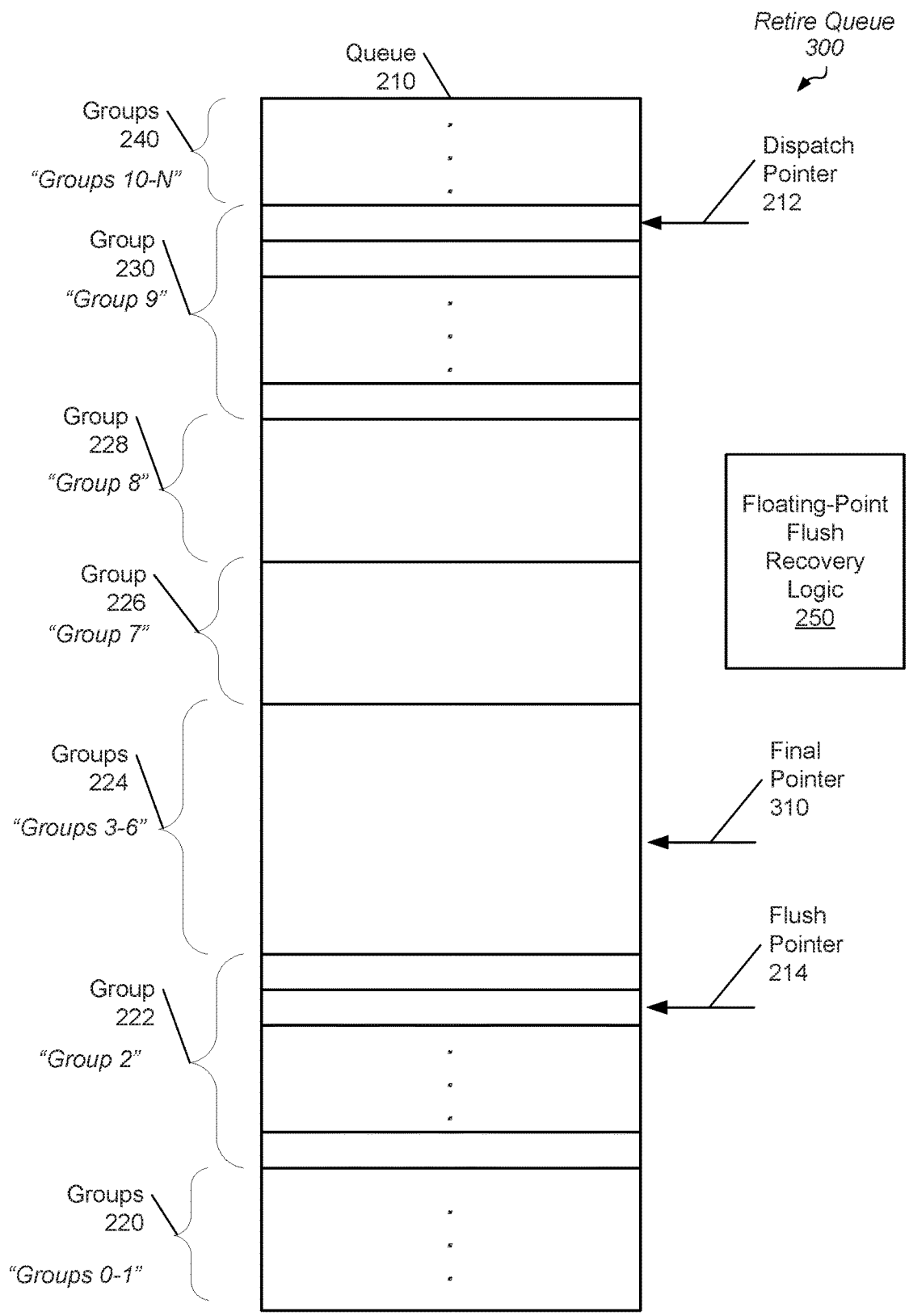
FIG. 3 is a block diagram of another embodiment of a retire queue.

Referring to FIG. 3, a generalized block diagram of another embodiment of a retire queue 300 is shown. Circuitry and logic previously described are numbered identically. As shown, retire queue 300 uses an additional pointer, which is final pointer 310. In some designs, pipeline flush recovery terminates when the dispatch pointer 212, which is updated during the pipeline flush recovery, matches the flush pointer 214. However, if only groups 9 and 7 contain information for instructions of a given type, then in other designs, logic 250 completes pipeline flush recovery for retire queue 300 when the dispatch pointer 212, which is updated during the pipeline flush recovery, matches the final pointer 310. Therefore, the pipeline flush recovery completes sooner. In some designs, without the final pointer 310, information for the group 2 is sent to external flush recovery logic regardless of whether group 2 stores information for instructions of the given type.

Figure 4:
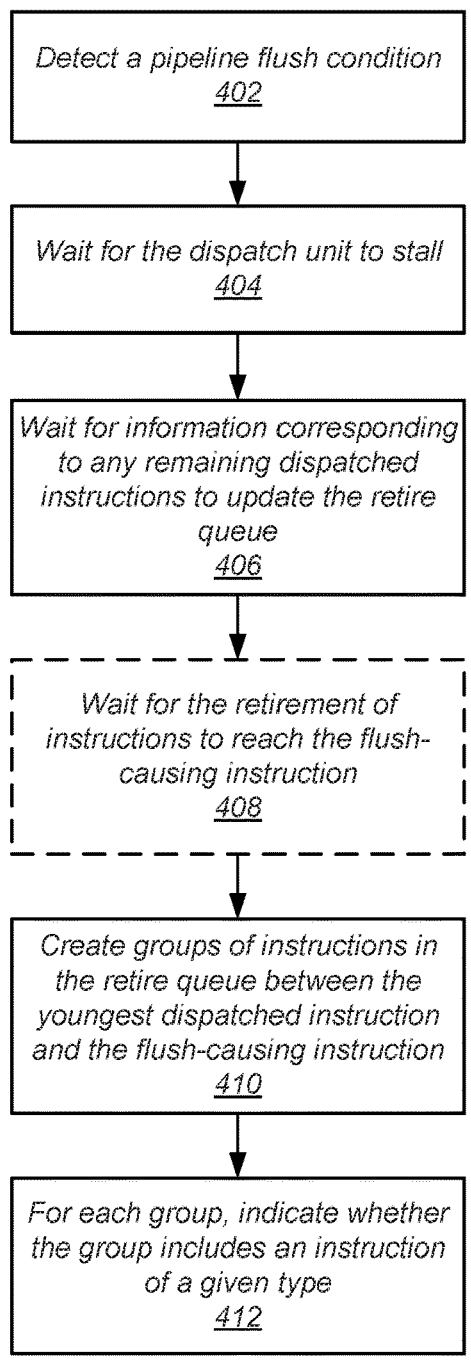
FIG. 4 is a flow diagram of one embodiment of a method for performing efficient processor pipeline recovery.

Referring now to FIG. 4, one embodiment of a method 400 for performing efficient processor pipeline flush recovery is shown. For purposes of discussion, the steps in this embodiment (as well as in FIGS. 4-6 and 8) are shown in sequential order. However, it is noted that in various embodiments of the described methods, one or more of the elements described are performed concurrently, in a different order than shown, or are omitted entirely. Other additional elements are also performed as desired. Any of the various systems or apparatuses described herein are configured to implement method 400.

A processor core includes a retire queue with multiple entries with each entry storing information for outstanding instructions that the processor core is processing. The processor core has not yet committed the results of these outstanding instructions to machine state. The retire queue includes logic for accessing the queue and for supporting flush recovery. The retire queue logic includes software, hardware, such as circuitry for implementing combinatorial logic and sequential elements, or a combination of software and hardware. The retire queue logic detects when a pipeline flush condition occurs (block 402).

The retire queue logic waits for the dispatch unit to stall (block 404). In addition, the retire queue logic waits for information corresponding to any remaining dispatched instructions to update the retire queue (block 406). In some designs, the retire queue logic waits for the retirement of instructions to reach the flush-causing instruction (block 408). In other designs, the retire queue logic does not wait for the retirement of instructions to reach the flush-causing instruction. The flush-causing instruction is the instruction that caused the detected flush condition to occur. For example, the processor core detects a branch misprediction occurred, a store-to-load forwarding misprediction occurred, or other. In these examples, the flush-causing instruction is the branch instruction or the load instruction.

The retire queue logic creates groups of instructions in the retire queue between the youngest dispatched instruction and the flush-causing instruction (block 410). In one embodiment, the retire queue logic creates one or more groups in a contiguous manner after creating a first group that contains the youngest dispatched instruction. In some designs, the retire queue logic continues to create groups until wrapping around the retire queue and reaching this first group, rather than ending the groups with a group that contains the flush-causing instruction. For each group, the retire queue logic indicates whether the group includes an instruction of a given type (block 412). In one example, the instructions of the given type are floating-point instructions. In some designs, for each group, the retire queue logic maintains data storage elements that store group indexes and indications of storing instructions of the given type.

Figure 5:
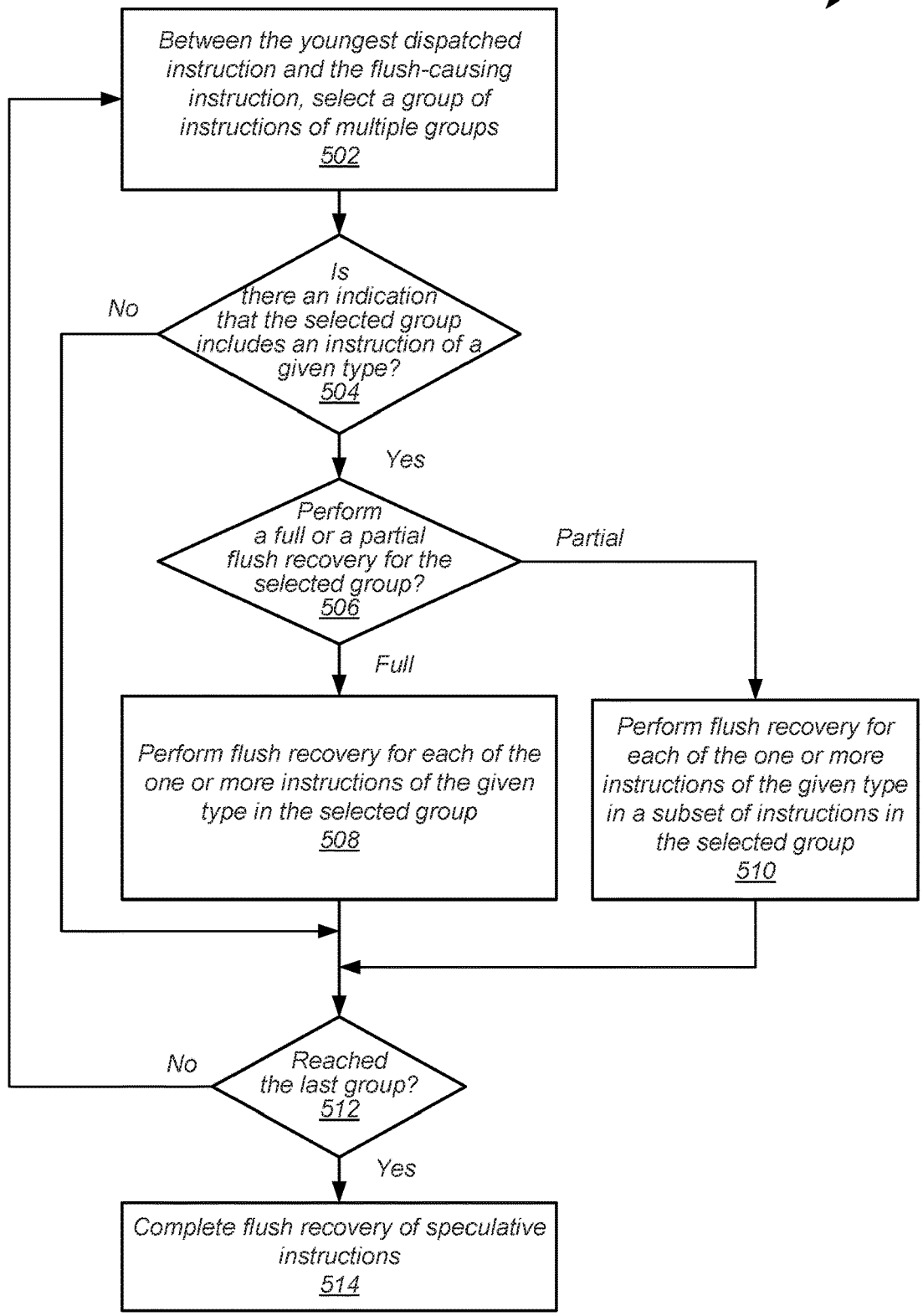
FIG. 5 is a flow diagram of one embodiment of a method for performing efficient processor pipeline recovery.

Referring now to FIG. 5, one embodiment of a method 500 for performing efficient processor pipeline flush recovery is shown. Between the youngest dispatched instruction and the flush-causing instruction, retire queue logic selects a group of instructions of multiple groups (block 502). If there is an indication that the selected group includes an instruction of a given type ("yes" branch of the conditional block 504), and it is determined that a full recovery is to be performed ("full" branch of the conditional block 506), then flush recovery is performed for each of the one or more instructions of the given type in the selected group (block 508). Otherwise, if it is determined that a partial recovery is to be performed ("partial" branch of the conditional block 506), then flush recovery is performed for each of the one or more instructions of the given type in a subset of instructions in the selected group (block 510). In one embodiment, partial flush recovery is performed for the oldest group marked for having instructions of the given type when the oldest instruction in the oldest group is not the flush-causing instruction. In addition, full flush recovery is performed for each other group marked for having instructions of the given type. For each of the full flush recovery and the partial flush recovery, the flush recovery logic completely performs flush recovery for an instruction in an entry selected for flush recovery. It is noted that the term "partial recovery" refers to a subset of instructions in a group selected for flush recovery are candidates for flush recovery. The term "partial recovery" does not refer to the flush recovery logic partially performs flush recovery for an instruction in an entry selected for flush recovery.

If there is an indication that the selected group does not include any instructions of the given type ("no" branch of the conditional block 504), then control flow of method 500 moves to conditional block 512. Similarly, after each of the blocks 508-510, control flow of method 500 moves to conditional block 512. If the last group is not reached ("no" branch of the conditional block 512), then control flow of method 500 returns to block 502 where the retire queue logic selects a group of instructions of multiple groups. Otherwise, if the last group is reached ("yes" branch of the conditional block 512), then flush recovery of speculative instructions is completed (block 514).

Figure 6:
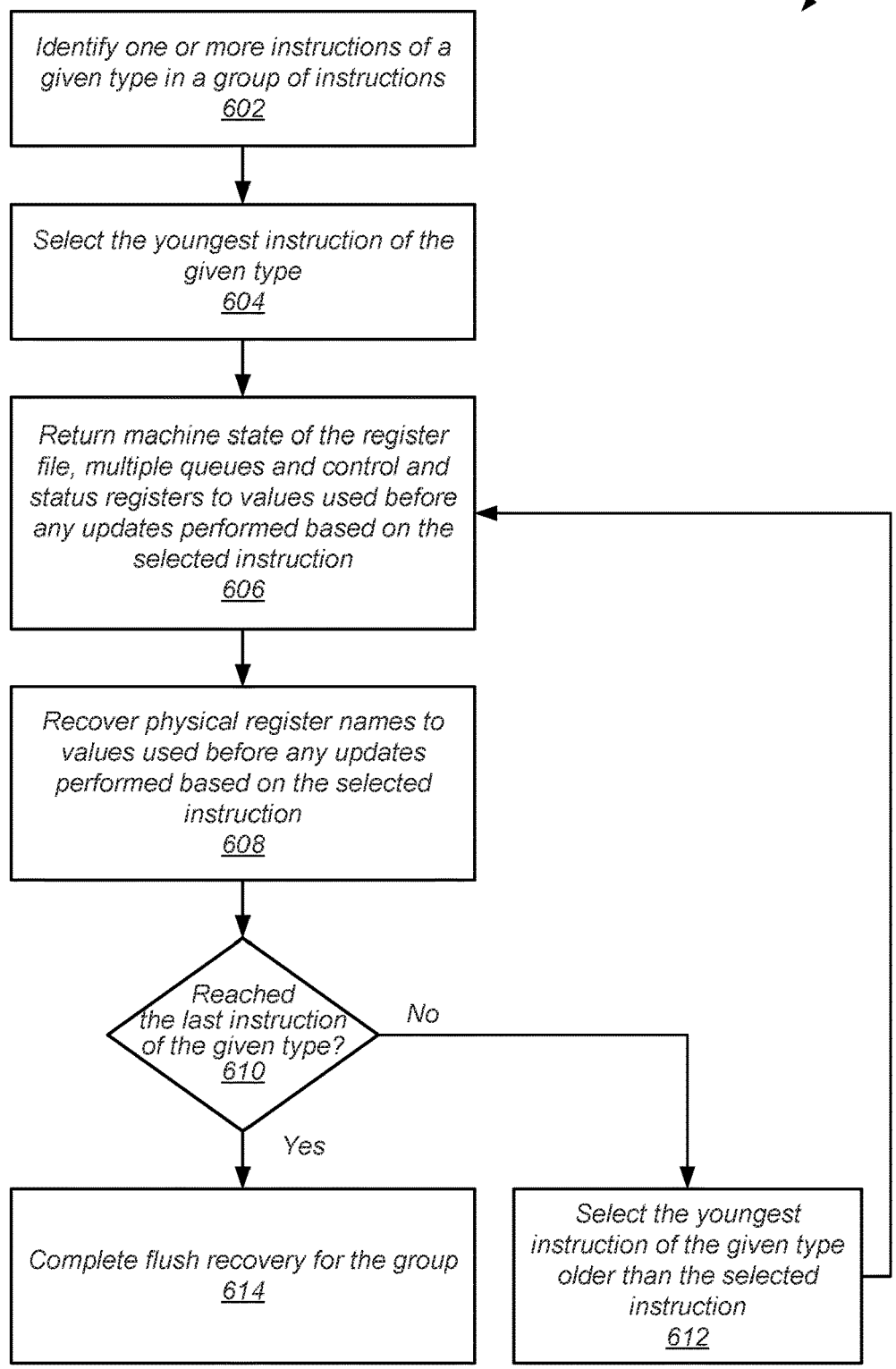
FIG. 6 is a flow diagram of one embodiment of a method for performing efficient processor pipeline recovery.

Referring to FIG. 6, one embodiment of a method 600 for performing efficient processor pipeline flush recovery is shown. One or more instructions of a given type are identified in a group of instructions (block 602). In some designs, the group of instructions have corresponding information stored in entries of a retire queue and the instructions of the given type are floating-point instructions. Logic in a processor core uses checkpointing for flush recovery for integer instructions, but not for floating-point instructions. In many cases, the floating-point instructions are more sparsely located in the retire queue than the integer instructions.

The youngest instruction of the given type is selected (block 604). Flush recovery logic in the processor core returns machine state of the register file, multiple queues and control and status registers to values used before any updates performed based on the selected instruction (block 606). Flush recovery logic in the processor core also recovers physical register names to values used before any updates performed based on the selected instruction (block 608). If the last instruction of the given type is not reached ("no" branch of the conditional block 610), then the logic in the processor core selects the youngest instruction of the given type older than the selected instruction (block 612). Afterward, control flow of method 600 returns to block 606 where the flush recovery logic returns the machine state of multiple resources. If the last instruction of the given type is reached ("yes" branch of the conditional block 610), then flush recovery completes for the group (block 614).

As described earlier, for each of the full flush recovery and the partial flush recovery, the flush recovery logic completely performs flush recovery for an instruction in an entry selected for flush recovery. For example, the flush recovery logic performs the above steps for blocks 606-614 of method 600. It is noted that the term "partial recovery" refers to a subset of instructions in a group selected for flush recovery are candidates for flush recovery. The term "partial recovery" does not refer to the flush recovery logic partially performs flush recovery for an instruction in an entry selected for flush recovery.

Figure 7:
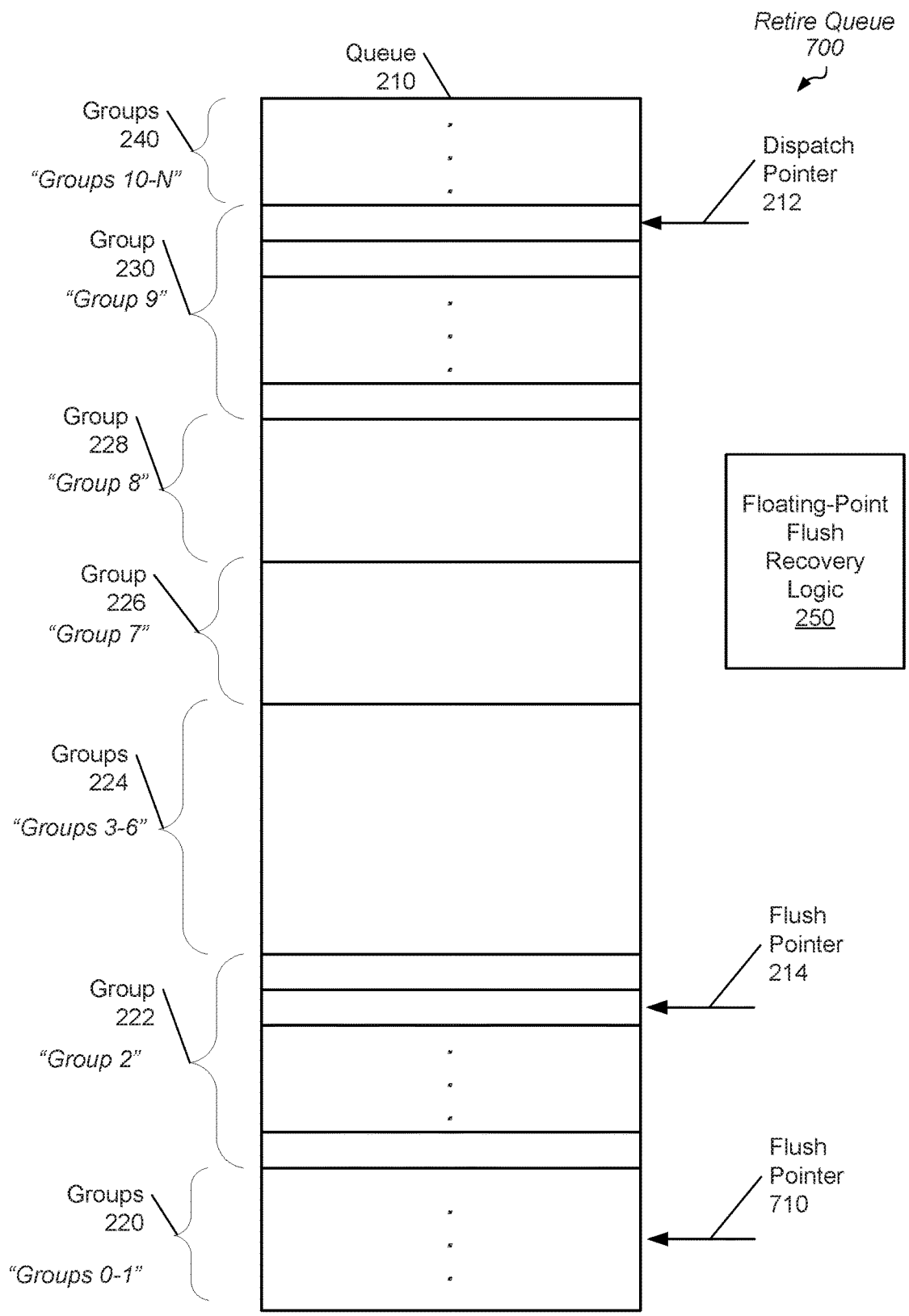
FIG. 7 is a block diagram of another embodiment of a retire queue.

Turning now to FIG. 7, a generalized block diagram of another embodiment of a retire queue 700 is shown. Circuitry and logic previously described are numbered identically. As shown, retire queue 700 uses an additional pointer, which is flush pointer 710. In some cases, a second flush condition occurs during the pipeline flush recovery for a first flush condition. For example, in some cases, computing resources for the integer instructions in the processor core begins execution again prior to the pipeline flush recovery completes for the floating-point instructions. It is possible for one of these integer instructions to cause a flush condition while the pipeline flush recovery continues for the floating-point instructions.

Based on the location of the second flush-causing instruction in the queue 210, the logic 250 takes extra steps to adjust the pipeline flush recovery continues for the floating-point instructions. For example, if the logic 250 detects that the second flush-causing instruction is in a same group (group 2) as the first flush-causing instruction, then the logic 250 updates the marking of the end of recovery in the group from the location of the first flush-causing instruction to the location of the second flush-causing instruction. However, if the logic 250 detects that the second flush-causing instruction is not in a same group (group 2) as the first flush-causing instruction, and the second flush-causing instruction is older, then the logic 250 changes flush recovery of the group (group 2) from a partial flush recovery to a full flush recovery.

Figure 8:
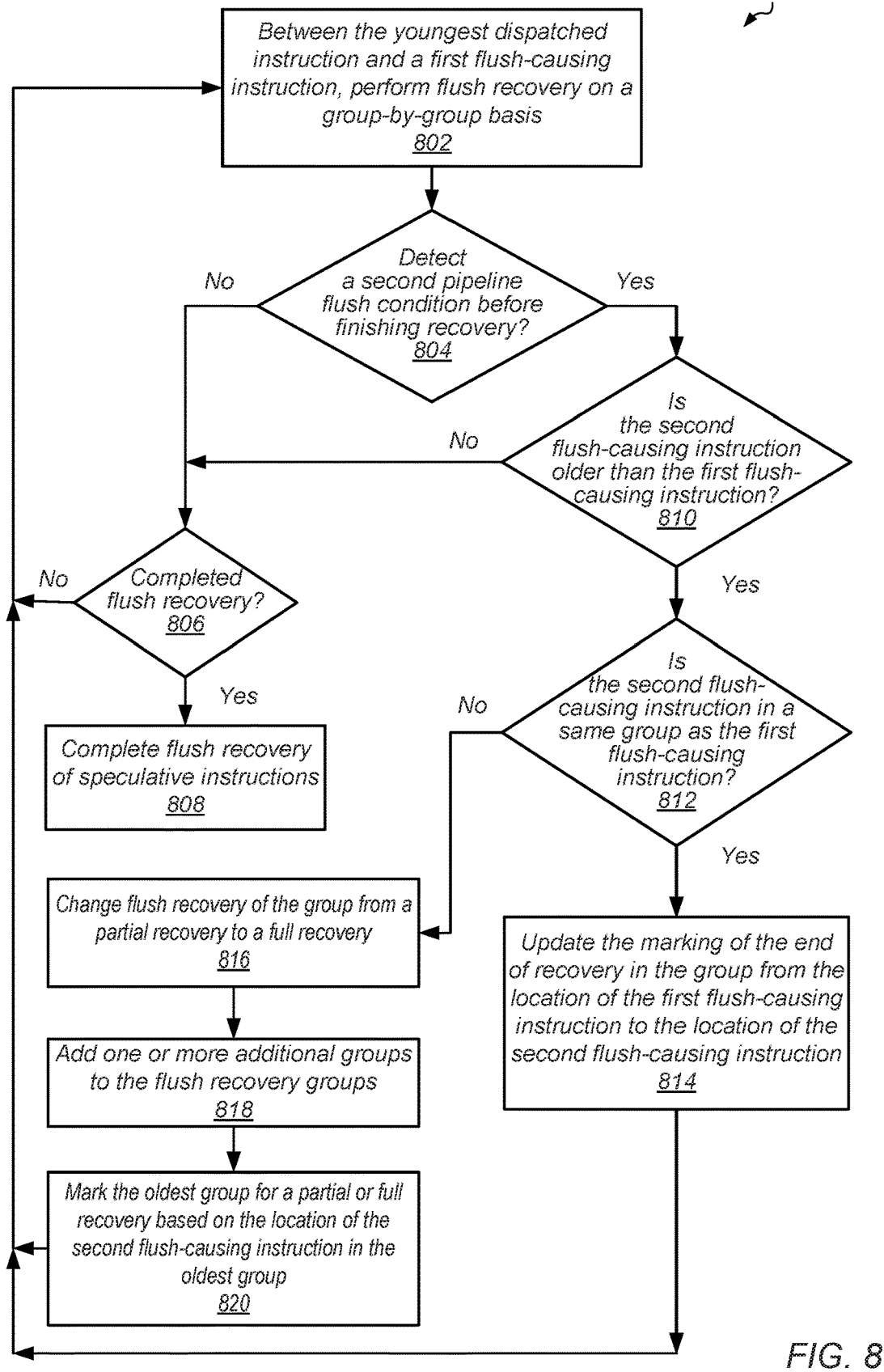
FIG. 8 is a flow diagram of one embodiment of a method for performing efficient processor pipeline recovery.

Referring now to FIG. 8, one embodiment of a method 800 for performing efficient processor pipeline flush recovery is shown. Between the youngest dispatched instruction and a first flush-causing instruction, logic in a processor core performs flush recovery on a group-by-group basis (block 802). In several designs, the logic performs the steps previously described. If the logic does not detect a second pipeline flush condition before finishing recovery ("no" branch of the conditional block 804), and flush recovery completed ("yes" branch of the conditional block 806), then flush recovery has completed (block 808). Otherwise, if flush recovery has not completed ("no" branch of the conditional block 806), then control flow of method 800 returns to block 802 where the logic performs flush recovery on a group-by-group basis.

If the logic detects a second pipeline flush condition before finishing recovery ("yes" branch of the conditional block 804), the second flush-causing instructions is older than the first flush-causing instruction (block 810), and the second flush-causing instruction is in a same group as the first flush-causing instruction ("yes" branch of the conditional block 812), then the logic updates the marking of the end of recovery in the group from the location of the first flush-causing instruction to the location of the second flush-causing instruction (block 814). However, if the logic detects that the second flush-causing instruction is not in a same group as the first flush-causing instruction ("no" branch of the conditional block 812), then the logic changes flush recovery of the group from a partial flush recovery to a full flush recovery (block 816). If the logic detects a second pipeline flush condition before finishing recovery ("yes" branch of the conditional block 804) and the second flush-causing instructions is not older than the first flush-causing instruction (block 810), processing continues with block 806.

The logic adds one or more additional groups to the flush recovery groups (block 818). The logic marks the oldest group for a partial or full recovery based on the location of the second flush-causing instruction in the oldest group (block 820). For example, if the second flush-causing instruction is the oldest instruction in the oldest group, and accordingly, the second flush-causing instruction is located at a far end of the oldest group away from the youngest instruction in the oldest group, then a full flush recovery is performed. Otherwise, a partial flush recovery is performed.

After each of blocks 814 and 820, control flow of method 800 returns to block 802 where the logic performs flush recovery on a group-by-group basis.

In various embodiments, program instructions of a software application are used to implement the methods and/or mechanisms previously described. The program instructions describe the behavior of hardware in a high-level programming language, such as C. Alternatively, a hardware design language (HDL) is used, such as Verilog. The program instructions are stored on a non-transitory computer readable storage medium. Numerous types of storage media are available. The storage medium is accessible by a computing system during use to provide the program instructions and accompanying data to the computing system for program execution. The computing system includes at least one or more memories and one or more processors that execute program instructions.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. An apparatus comprising:
   a queue comprising a plurality of entries, each configured to store information for an instruction; and
   logic comprising circuitry; and
   wherein in response to detecting a first pipeline flush condition, the circuitry is configured to:
      create one or more groups of entries in the queue beginning with a first entry storing information for a youngest instruction and ending with a second entry storing information for an instruction that caused the first pipeline flush condition;
      mark each group of the one or more groups that is determined, by the circuitry, to include an instruction of a given type with a first indication;
      mark each group of the one or more groups that is determined, by the circuitry, to not include an instruction of the given type with a second indication different from the first indication;
      convey, to flush recovery logic, instruction identifiers stored in entries storing information for instructions of the given type in each group marked with the first indication; and
   prevent sending, to the flush recovery logic, instruction identifiers stored in entries in each group marked with the second indication.

2. The apparatus as recited in claim 1, wherein the circuitry is further configured to send, to the flush recovery logic, instruction identifiers of each entry storing information for the instructions of the given type in any group marked with the first indication that is not an oldest group marked with the first indication.

3. The apparatus as recited in claim 2, wherein the circuitry is further configured to send instruction identifiers of only those entries, in the oldest group marked with the first indication, that are storing information for instructions of the given type that are not older than the instruction that caused the first pipeline flush condition.

4. The apparatus as recited in claim 1, wherein the circuitry is further configured to maintain:
   a first pointer identifying a group storing the first entry; and
   a second pointer identifying a group storing the second entry.

5. The apparatus as recited in claim 4, wherein the circuitry is further configured to maintain a third pointer identifying a group storing an oldest group marked with the first indication.

6. The apparatus as recited in claim 1, wherein in response to
   detecting, by the circuitry, a second pipeline flush condition after the first pipeline condition and prior to the flush recovery logic completing, and
   determining, by the circuitry, that an instruction that caused the second pipeline flush condition is both in a same group as the instruction that caused the first pipeline flush condition and is older than the instruction that caused the first pipeline flush condition,
   the circuitry is configured to update a marking of an end of recovery in said same group from a location of the instruction that caused the first pipeline flush condition to a location of the instruction that caused the second pipeline flush condition.

7. The apparatus as recited in claim 1, wherein the instructions of the given type are floating-point instructions and the queue is a retire queue.

8. A method, comprising:
   storing information for instructions in a queue comprising a plurality of entries;
   in response to detecting a first pipeline flush condition:
      creating one or more groups of entries in the queue beginning with a first entry storing information for a youngest instruction and ending with a second entry storing information for an instruction that caused the first pipeline flush condition;
      marking each group of the one or more groups with:
         a first indication responsive to determining the group includes an instruction of a given type; or
         a second indication different from the first indication responsive to determining the group does not include an instruction of the given type;
      conveying, to flush recovery logic, instruction identifiers stored in those entries storing information for instructions of the given type in any group marked with the first indication; and
      preventing sending, to the flush recovery logic, instruction identifiers stored in those entries in any group marked with the second indication.

9. The method as recited in claim 8, further comprising sending instruction identifiers of each entry storing information for the instructions of the given type in any group marked with the first indication that is not an oldest group marked with the first indication.

10. The method as recited in claim 9, further comprising sending, to the flush recovery logic, instruction identifiers of only those entries, in the oldest group marked with the first indication, that are storing information for instructions of the given type that are not older than the instruction that caused the first pipeline flush condition.

11. The method as recited in claim 8, further comprising maintaining:
   a first pointer identifying a group storing the first entry; and
   a second pointer identifying a group storing the second entry.

12. The method as recited in claim 11, further comprising maintaining a third pointer identifying a group storing an oldest group marked with the first indication.

13. The method as recited in claim 8, wherein in response to
   detecting a second pipeline flush condition after the first pipeline condition and prior to the flush recovery logic completing, and
   determining that an instruction that caused the second pipeline flush condition is both in a same group as the instruction that caused the first pipeline flush condition and is older than the instruction that caused the first pipeline flush condition,
   the method further comprises updating a marking of an end of recovery in said same group from a location of the instruction that caused the first pipeline flush condition to a location of the instruction that caused the second pipeline flush condition.

14. The method as recited in claim 8, wherein the instructions of the given type are floating-point instructions and the queue is a retire queue.

15. A non-transitory computer readable storage medium storing program instructions, wherein the program instructions are executable by a processor to:
   store information for instructions in a queue comprising a plurality of entries;
   wherein in response to detecting a first pipeline flush condition:
      create one or more groups of entries in the queue beginning with a first entry storing information for a youngest instruction and ending with a second entry storing information for an instruction that caused the first pipeline flush condition;
      mark each group of the one or more groups that is determined to include an instruction of a given type with a first indication;
      mark each group of the one or more groups that is determined to not include an instruction of a given type with a second indication different from the first indication;
      convey, to flush recovery logic, instruction identifiers stored in those entries storing information for instructions of the given type in any group marked with the first indication; and
      prevent sending, to the flush recovery logic, instruction identifiers stored in entries in any group marked with the second indication.

16. The non-transitory computer readable storage medium as recited in claim 15, wherein the program instructions are executable by the processor to send to the flush recovery logic instruction identifiers of each entry storing information for the instructions of the given type in any group marked with the first indication that is not the oldest group marked with the first indication.

17. The non-transitory computer readable storage medium as recited in claim 15, wherein the program instructions are executable by the processor to, send instruction identifiers of only those entries, in an oldest group marked with the first indication, that are storing information for instructions of the given type that are not older than the instruction that caused the first pipeline flush condition.

18. The non-transitory computer readable storage medium as recited in claim 15, wherein the program instructions are executable by the processor to maintain:
   a first pointer identifying a group storing the first entry; and
   a second pointer identifying a group storing the second entry.

19. The non-transitory computer readable storage medium as recited in claim 15, wherein in response to detecting a second pipeline flush condition after the first pipeline condition and prior to the flush recovery logic completing, and determining that an instruction that caused the second pipeline flush condition is both in a same group as the instruction that caused the first pipeline flush condition and is older than the instruction that caused the first pipeline flush condition, the program instructions are executable by the processor to update a marking of an end of recovery in said same group from a location of the instruction that caused the first pipeline flush condition to a location of the instruction that caused the second pipeline flush condition.

20. The non-transitory computer readable storage medium as recited in claim 15, wherein the instructions of the given type are floating-point instructions and the queue is a retire queue.

\* \* \* \* \*